US012789784B2

(12) United States Patent
Yang et al.

(10) Patent No.: US 12,789,784 B2
(45) Date of Patent: Nov. 10, 2026

(54) HYBRID POWERTRAIN AND CONTROL APPARATUS

(71) Applicant: Huawei Digital Power Technologies Co., Ltd., Shenzhen (CN)

(72) Inventors: Lizhou Yang, Xi'an (CN); Wenda Li, Dongguan (CN); Jie Tang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 14 days.

(21) Appl. No.: 18/793,334

(22) Filed: Aug. 2, 2024

(65) Prior Publication Data

US 2025/0042387 A1 Feb. 6, 2025

(30) Foreign Application Priority Data

Aug. 3, 2023 (CN) ........................ 202310979988.X

(51) Int. Cl.
*B60W 20/15* (2016.01)

(52) U.S. Cl.
CPC ....... *B60W 20/15* (2016.01); *B60W 2710/083* (2013.01); *B60W 2710/086* (2013.01)

(58) Field of Classification Search
CPC ........... B60W 20/15; B60W 2710/083; B60W 2710/086; B60W 30/18127; B60K 6/448; B60K 6/52; B60L 7/14; B60L 7/18; B60L 15/20; B60L 58/12; B60L 2210/40; B60L 2220/56; B60L 2240/421; B60L 2240/423;

(Continued)

(56) References Cited

U.S. PATENT DOCUMENTS 10,291,110 B2 * 5/2019 Watanabe ........ H03K 17/04123
2009/0090574 A1 * 4/2009 Kuno ...................... B60L 53/14
180/65.265

(Continued)

FOREIGN PATENT DOCUMENTS

EP 2025551 A1 2/2009
EP 3902087 A1 10/2021

OTHER PUBLICATIONS

Y. Wang et al., "A Hybrid Isolated Bidirectional DC/DC Solid-State Transformer for DC Distribution Network," in IEEE Access, vol. 9, pp. 159059-159070, 2021 (Year: 2021).*

*Primary Examiner* — Russell Frejd
*Assistant Examiner* — Ana D Thomas
(74) *Attorney, Agent, or Firm* — Leydig, Voit & Mayer, Ltd.

(57) ABSTRACT

This application provides a hybrid powertrain. The hybrid powertrain includes a generator, a motor, a dual-motor controller, and a switch module. The dual-motor controller includes a generator power circuit and a motor power circuit. A running status of the switch module includes a first state and a second state. If the switch module is in the first state, the switch module is configured to connect to an end of a power battery and a center tap of a multiphase winding of the motor. If the switch module is in the second state, the switch module is configured to connect to an end of a power battery and an end of a plurality of switching transistor bridge arms of the motor power circuit. According to the hybrid powertrain and the control apparatus provided in this application entire vehicle endurance and power performance of the electric vehicle can be improved.

18 Claims, 12 Drawing Sheets

(58) Field of Classification Search
CPC ......... B60L 2240/427; B60L 2240/547; B60L 2260/28; B60L 15/007; B60L 2220/42; B60L 50/51; B60L 50/16
See application file for complete search history.

(56) References Cited

U.S. PATENT DOCUMENTS

| | | | |
|---|---|---|---|
| 2017/0166068 A1 | 6/2017 | Kim et al. | |
| 2020/0307392 A1 | 10/2020 | Joseph et al. | |
| 2022/0355674 A1* | 11/2022 | Yan ......................... | B60L 15/20 |

* cited by examiner

HYBRID POWERTRAIN AND CONTROL APPARATUS

CROSS-REFERENCE TO RELATED APPLICATIONS

This application claims priority to Chinese Patent Application No. 202310979988.X, filed on Aug. 3, 2023, which is hereby incorporated by reference in its entirety.

TECHNICAL FIELD

This application relates to the field of motor control technologies, and in particular, to a hybrid powertrain and a control apparatus.

BACKGROUND

With development of new energy technologies, electric vehicles are more widely used. The electric vehicle usually controls torque of a motor by using a motor controller. If a vehicle speed of the electric vehicle is high and a state of charge (State of Charge, SOC) of a battery is low, a torque output of the motor controller is insufficient and inefficient. Generally, a bidirectional DC-DC conversion circuit is used to increase a bus voltage of the motor controller, to enhance a torque output capability of the motor controller and improve torque output efficiency of the motor controller. In addition, in a scenario of braking of the electric vehicle, the bidirectional DC-DC conversion circuit needs to reduce the bus voltage of the motor controller, to cooperate in energy recovery of the motor. However, the bidirectional DC-DC conversion circuit increases costs, a volume, and heat of the motor controller.

SUMMARY

In view of the foregoing problem, this application provides a hybrid powertrain and a control apparatus, to reduce costs and an occupied area for additionally disposing a bidirectional DC/DC conversion circuit, to reduce heat, improve running efficiency and a torque output capability of a drive motor, and increase an endurance capability of an electric vehicle.

According to a first aspect, this application provides a hybrid powertrain for an electric vehicle. The hybrid powertrain includes a generator, a motor, a dual-motor controller, and a switch module, and the dual-motor controller includes a generator power circuit and a motor power circuit; bridge arm midpoints of a plurality of switching transistor bridge arms of the generator power circuit are configured to connect to a multiphase winding of the generator, and bridge arm midpoints of a plurality of switching transistor bridge arms of the motor power circuit are configured to connect to a multiphase winding of the motor; two ends of the plurality of bridge arms of the generator power circuit are configured to connect to two ends of a bus capacitor, and two ends of the motor power circuit are configured to connect to the two ends of the bus capacitor; and a running status of the switch module includes a first state and a second state, where if the switch module is in the first state, the switch module is configured to connect to an end of a power battery and a center tap of the multiphase winding of the motor; or if the switch module is in the second state, the switch module is configured to connect to an end of a power battery and an end of the plurality of switching transistor bridge arms of the motor power circuit. In this application, the switch module is disposed, and different ports are selected based on different running statuses of the switch module to connect to the end of the power battery, so that the multiphase winding and the plurality of switching transistor bridge arms form different circuits. When the motor is in different working statuses, the voltage between the two ends of the bus capacitor are controlled, to adjust a working mode of the hybrid powertrain.

With reference to the first aspect, in a possible implementation, the motor is in transmission connection with a pair of wheels of the electric vehicle. In response to that the motor rotates with the pair of wheels and the switch module runs in the first state, the multiphase winding of the motor and the plurality of switching transistor bridge arms of the motor power circuit form a voltage conversion circuit. According to the hybrid powertrain provided in this application, in a scenario in which the motor rotates with the wheels, the switch module is in the first state, so that the multiphase winding and the plurality of switching transistor bridge arms form the voltage conversion circuit, to adjust the voltage between the two ends of the bus capacitor, thereby adapting to a plurality of running scenarios of the motor.

With reference to the first aspect, in a possible implementation, in a process in which the motor rotates with the pair of wheels, in response to that an output voltage of the power battery is less than a preset voltage value and the switch module is in the first state, the voltage conversion circuit is configured to increase the voltage between the two ends of the bus capacitor.

With reference to the first aspect, in a possible implementation, in the process in which the motor rotates with the pair of wheels, in response to that the output voltage of the power battery is less than the preset voltage value and the switch module is in the first state, at least one lower bridge arm switching transistor of the switching transistor bridge arms of the voltage conversion circuit is turned on at a preset duty cycle in each switch cycle. According to the hybrid powertrain provided in this application, in a scenario in which the output voltage of the power battery is less than the preset voltage value in the process in which the motor rotates with the wheels, the at least one lower bridge arm switching transistor of the switching transistor bridge arms may be turned on at the preset duty cycle in each switch cycle, to form a loop between the power battery and the voltage conversion circuit, so that the power battery discharges to the voltage conversion loop, to increase voltages between two ends of a plurality of bus capacitors. Alternatively, the voltage conversion loop charges the power battery, to reduce voltages between two ends of bus capacitors.

With reference to the first aspect, in a possible implementation, in the process in which the motor rotates with the pair of wheels, in response to that the output voltage of the power battery is less than the preset voltage value and the switch module is in the first state, at least one upper bridge arm switching transistor and at least one lower bridge arm switching transistor of the switching transistor bridge arms of the voltage conversion circuit are alternately turned on. According to the hybrid powertrain provided in this application, in a scenario in which the output voltage of the power battery is less than the preset voltage value in the process in which the motor rotates with the wheels, the at least one upper bridge arm switching transistor and the at least one lower bridge arm switching transistor of the switching transistor bridge arms are alternately turned on, to form a loop between the power battery and the voltage conversion circuit, so that the power battery discharges to the voltage conversion loop, to increase the voltage between the two ends of the bus capacitor. Alternatively, the voltage conversion loop charges the power battery, to reduce the voltage between the two ends of the bus capacitor.

With reference to the first aspect, in a possible implementation, in response to that the output voltage of the power battery is less than the preset voltage value, the generator is configured to output an alternating current. According to the hybrid powertrain provided in this application, if the output voltage of the power battery is less than the preset value, the generator may be controlled to output the alternating current, so that the alternating current output by the generator charges the power battery through the generator power circuit, and the voltage between the two ends of the bus capacitor is increased, thereby improving working efficiency and an output power of the motor, and improving entire vehicle endurance and power performance of the electric vehicle.

With reference to the first aspect, in a possible implementation, the electric vehicle includes a powertrain, the powertrain includes a motor controller and a drive motor. In response to that a target torque value of the drive motor is greater than a preset torque value or a target rotation speed value of the drive motor is greater than a preset rotation speed value, and the motor rotates with the wheels, at least one lower bridge arm switching transistor of the switching transistor bridge arms of the voltage conversion circuit is turned on at a preset duty cycle in each switch cycle, or at least one upper bridge arm switching transistor and at least one lower bridge arm switching transistor of the switching transistor bridge arms of the voltage conversion circuit are alternately turned on. According to the hybrid powertrain provided in this application, in a scenario in which a target torque value of another drive motor is greater than a preset torque value or a target rotation speed value of another drive motor is greater than a preset rotation speed value in the process in which the motor rotates with the wheels, at least one lower bridge arm switching transistor of the switching transistor bridge arms is turned on at a preset duty cycle in each switch cycle, or an upper bridge arm switching transistor and a lower bridge arm switching transistor are alternately turned on, to form a loop between the power battery and the voltage conversion circuit, so that the power battery discharges to the voltage conversion loop, to increase the voltage between the two ends of the bus capacitor and provide a higher bus voltage for another motor, thereby improving running efficiency and a torque output capability of the motor, and increasing a battery life of the electric vehicle.

With reference to the first aspect, in a possible implementation, in response to that the drive motor is configured to rotate with the wheels to generate an induced current, the voltage between the two ends of the bus capacitor is greater than a preset value, and the motor rotates with the wheels, at least one upper bridge arm switching transistor and at least one lower bridge arm switching transistor of the voltage conversion circuit are alternately turned on. According to the hybrid powertrain provided in this application, in a scenario in which another drive motor rotates with the wheels to generate an induced current and the voltage between the two ends of the bus capacitor is greater than a preset value in the process in which the motor rotates with the wheels, at least one upper bridge arm switching transistor and at least one lower bridge arm switching transistor of the switching transistor bridge arms may be controlled to be alternately turned on, so that in a scenario in which the another drive motor needs to perform energy recovery, the voltage between the two ends of the bus capacitor is reduced, and energy recovery efficiency is improved.

With reference to the first aspect, in a possible implementation, in a process in which the drive motor rotates with the wheels to generate an induced current, in response to that the voltage between the two ends of the bus capacitor is greater than a preset value, at least one upper bridge arm switching transistor of the voltage conversion circuit is turned on at a preset duty cycle in each switch cycle. According to the hybrid powertrain provided in this application, in a scenario in which another drive motor rotates with the wheels to generate an induced current and the voltage between the two ends of the bus capacitor is greater than the preset value in a process in which the drive motor rotates with the wheels, at least one upper bridge arm switching transistor of the switching transistor bridge arms may be turned on at a preset duty cycle in each switch cycle, so that in a scenario in which the another drive motor needs to perform energy recovery, the voltage between the two ends of the bus capacitor is reduced, and energy recovery efficiency is improved.

With reference to the first aspect, in a possible implementation, in response to a first torque signal, the switch module is in the second state, the bridge arm midpoints of the plurality of switching transistor bridge arms of the motor power circuit output an alternating current to drive the motor to output torque indicated by the first torque signal, and the torque of the motor indicated by the first torque signal is greater than a preset torque value. According to the hybrid powertrain provided in this application, in a scenario in which the motor needs to output torque, the switch module may be controlled to be in the second state, so that the motor power circuit receives power supplied by the power battery and outputs the alternating current to drive the motor to output corresponding torque, thereby improving compatibility of the motor controller and adaptability to different working scenarios of the motor.

With reference to the first aspect, in a possible implementation, in response to a second torque signal, the switch module is in the second state, switching transistors of the plurality of switching transistor bridge arms of the motor power circuit are turned off, and torque indicated by the second torque signal is less than a preset torque value. According to the hybrid powertrain provided in this application, if no torque needs to be output, the switch module is in the second state, and the switching transistors of the plurality of switching transistor bridge arms are turned off, to disconnect an alternating current output by the motor power circuit to the motor, thereby reducing power consumption of the powertrain.

With reference to the first aspect, in a possible implementation, the switch module includes a static contact and two moving contacts, the static contact of the switch module is connected to an end of the power battery, and the two moving contacts of the switch module are respectively connected to a midpoint tap of the auxiliary drive motor and an end of the plurality of switching transistor bridge arms. In the hybrid powertrain provided in this application, the switch module may include the two moving contacts and the static contact, and the end of the power battery is connected to the midpoint tap of the motor or the end of the plurality of switching transistor bridge arms by using a single-pole multi-throw switch module.

With reference to the first aspect, in a possible implementation, the switch module includes a first switch and a second switch, the first switch is configured to connect to a midpoint tap of the drive motor and an end of the plurality of switching transistor bridge arms, and the second switch is configured to connect to an end of the plurality of switching transistor bridge arms and an end of the power battery. In the hybrid powertrain provided in this application, the switch module may include two different switches, and the end of the power battery is connected to the midpoint tap of the drive motor or the end of the plurality of switching transistor bridge arms by using the two different switches.

According to a second aspect, this application provides a control apparatus for an electric vehicle. The electric vehicle includes a hybrid powertrain, a powertrain, and a switch module. The hybrid powertrain is configured to be in transmission connection with a pair of wheels of the electric vehicle, and the powertrain is configured to be in transmission connection with the other pair of wheels of the electric vehicle. A main powertrain includes a motor controller and a drive motor, and the hybrid powertrain includes a generator, a motor, a dual-motor controller, and a switch module. The dual-motor controller includes a generator power circuit and a motor power circuit. Bridge arm midpoints of a plurality of switching transistor bridge arms of the generator power circuit are configured to connect to a multiphase winding of the generator, and bridge arm midpoints of a plurality of switching transistor bridge arms of the motor power circuit are configured to connect to a multiphase winding of the motor. Two ends of the plurality of bridge arms of the generator power circuit are configured to connect to two ends of a bus capacitor, and two ends of the plurality of bridge arms of the motor power circuit are configured to connect to the two ends of the bus capacitor.

The control apparatus responds to a case in which the motor is configured to rotate with the wheels, and the control apparatus is configured to control the switch module to connect to an end of a power battery and a center tap of the multiphase winding of the motor.

With reference to the second aspect, in a possible implementation, in a process in which the drive motor drives the wheels and the motor is configured to rotate with the wheels, the control apparatus responds to a case in which a voltage between the two ends of the bus capacitor is less than a preset value, and the control apparatus is configured to: control at least one lower bridge arm switching transistor of the bridge arms of the motor power circuit to be turned on at a preset duty cycle in each switch cycle, or control at least one upper bridge arm switching transistor and at least one lower bridge arm switching transistor of the bridge arms of the motor power circuit to be alternately turned on.

With reference to the second aspect, in a possible implementation, the control apparatus responds to a case in which the drive motor is configured to output an alternating current, the motor is configured to rotate with the wheels, and a voltage between the two ends of the bus capacitor is greater than a preset value, and the control apparatus is configured to: control at least one upper bridge arm switching transistor of the bridge arms of the motor power circuit to be turned on at a preset duty cycle in each switch cycle, or control at least one upper bridge arm switching transistor and at least one lower bridge arm switching transistor of bridge arms of the dual-motor controller to be alternately turned on.

In addition, for beneficial effect obtained in possible implementations of the second aspect, refer to beneficial effect obtained in corresponding implementations of the first aspect. Details are not described herein again.

DESCRIPTION OF EMBODIMENTS

Figure 1:
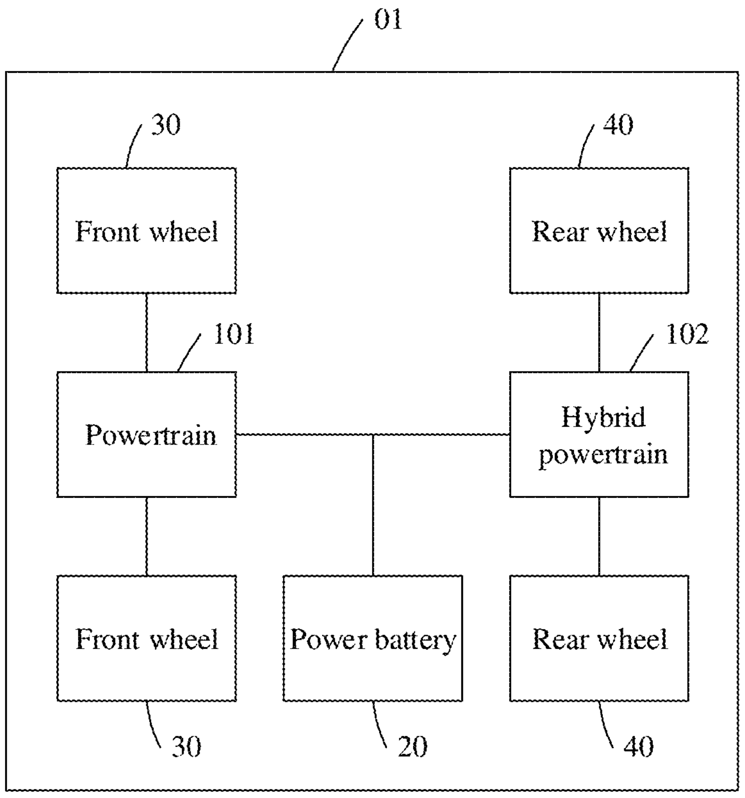
FIG. 1 is a diagram of a structure of an electric vehicle according to this application.

The following clearly describes technical solutions in embodiments of this application with reference to accompanying drawings in embodiments of this application.

It may be understood that a connection relationship described in this application is a direct or indirect connection. For example, that A is connected to B may indicate that A is directly connected to B, or may indicate that A is indirectly connected to B through one or more other electrical components. For example, A may be directly connected to C, and C may be directly connected to B, so that A and B are connected through C. It may be further understood that "A is connected to B" described in this application may indicate that A is directly connected to B, or may indicate that A is indirectly connected to B through one or more other electrical components.

In descriptions of this application, unless otherwise specified, "/" indicates "or". For example, A/B may indicate A or B. A term "and/or" in this specification describes only an association relationship for describing associated objects and indicates that three relationships may exist. For example, A and/or B may indicate the following three cases: Only A exists, both A and B exist, and only B exists.

In the descriptions of this application, terms such as "first" and "second" are merely used to distinguish between different objects, and do not limit a quantity or an execution sequence. In addition, the terms such as "first" and "second" do not indicate a definite difference. In addition, terms "include", "have", or any other variants thereof are intended to cover a non-exclusive inclusion.

The following further describes the technical solutions of this application in detail with reference to the accompanying drawings.

A drive system of an electric vehicle develops towards a high voltage, that is, a working voltage of a drive motor of the electric vehicle is increasingly high. Increasing the working voltage of the drive motor can reduce a working current of the drive motor, to reduce costs of conducting wires of the drive motor. In addition, power density, efficiency, and a rotation speed of the drive motor can be improved, and a requirement for a high-power output of the drive motor can be met. In the electric vehicle, a motor controller receives power supplied by a power battery and provides the working voltage for the drive motor. However, in a discharging process of the power battery, an output voltage of the power battery decreases as electricity of the power battery decreases. When remaining electricity of the power battery is low, the output voltage of the power battery decreases. Therefore, it is difficult for the drive motor to run at a high working voltage, resulting in a decrease in an output power and working efficiency of the drive motor. In addition, the current electric vehicle has an energy recovery function. To be specific, in a braking process of the electric vehicle, the drive motor runs in a power generation mode, and the motor controller converts a high-voltage alternating current generated by the drive motor into a direct current to charge the power battery. However, the drive motor generates the high-voltage alternating current when generating power. After the motor controller converts the high-voltage alternating current generated by the drive motor into a high-voltage direct current, if a voltage of the high-voltage direct current exceeds a charging voltage of the power battery, performance of the power battery is damaged.

A manner of resolving the foregoing problem is to dispose a bidirectional DCDC conversion circuit DCDC in the electric vehicle. When the output voltage of the power battery is low, the bidirectional DCDC conversion circuit is configured to increase the output voltage of the power battery and supply power to the drive motor, to increase the working voltage of the drive motor. When the drive motor is configured to generate power, the bidirectional DCDC conversion circuit is configured to reduce a voltage of a high-voltage current generated by the drive motor and charge the power battery.

However, using the bidirectional DCDC conversion circuit to resolve the foregoing problem may increase costs, increase a volume of a powertrain, and cause a problem such as heat dissipation difficulty.

Therefore, this application provides a powertrain, a control apparatus for an electric vehicle, and an electric vehicle. According to the powertrain provided in this application, a three-phase bridge arm of a motor controller and a three-phase winding of a drive motor are reused to form a voltage conversion circuit. The voltage conversion circuit is configured to adjust a voltage of a bus capacitor of the motor controller, to reduce costs and an occupied area for additionally disposing a bidirectional DC/DC conversion circuit, to reduce heat, improve running efficiency and a torque output capability of the drive motor, and increase a battery life of the electric vehicle.

Refer to FIG. 1. FIG. 1 is a diagram of a structure of an electric vehicle 01 according to an embodiment of this application. The electric vehicle 01 includes a powertrain 101, a hybrid powertrain 102, a power battery 20, two front wheels 30, and two rear wheels 40.

The power battery 20 is electrically connected to the powertrain 101 and the hybrid powertrain 102. The power battery 20 is configured to supply power to the powertrain 101 and the hybrid powertrain 102.

In an embodiment, the powertrain 101 is configured to drive the two front wheels 30, and the hybrid powertrain 102 is configured to drive the two rear wheels 40.

In an embodiment, the powertrain 101 is configured to drive the two rear wheels 40, and the hybrid powertrain 102 is configured to drive the two front wheels 30.

Figure 2:
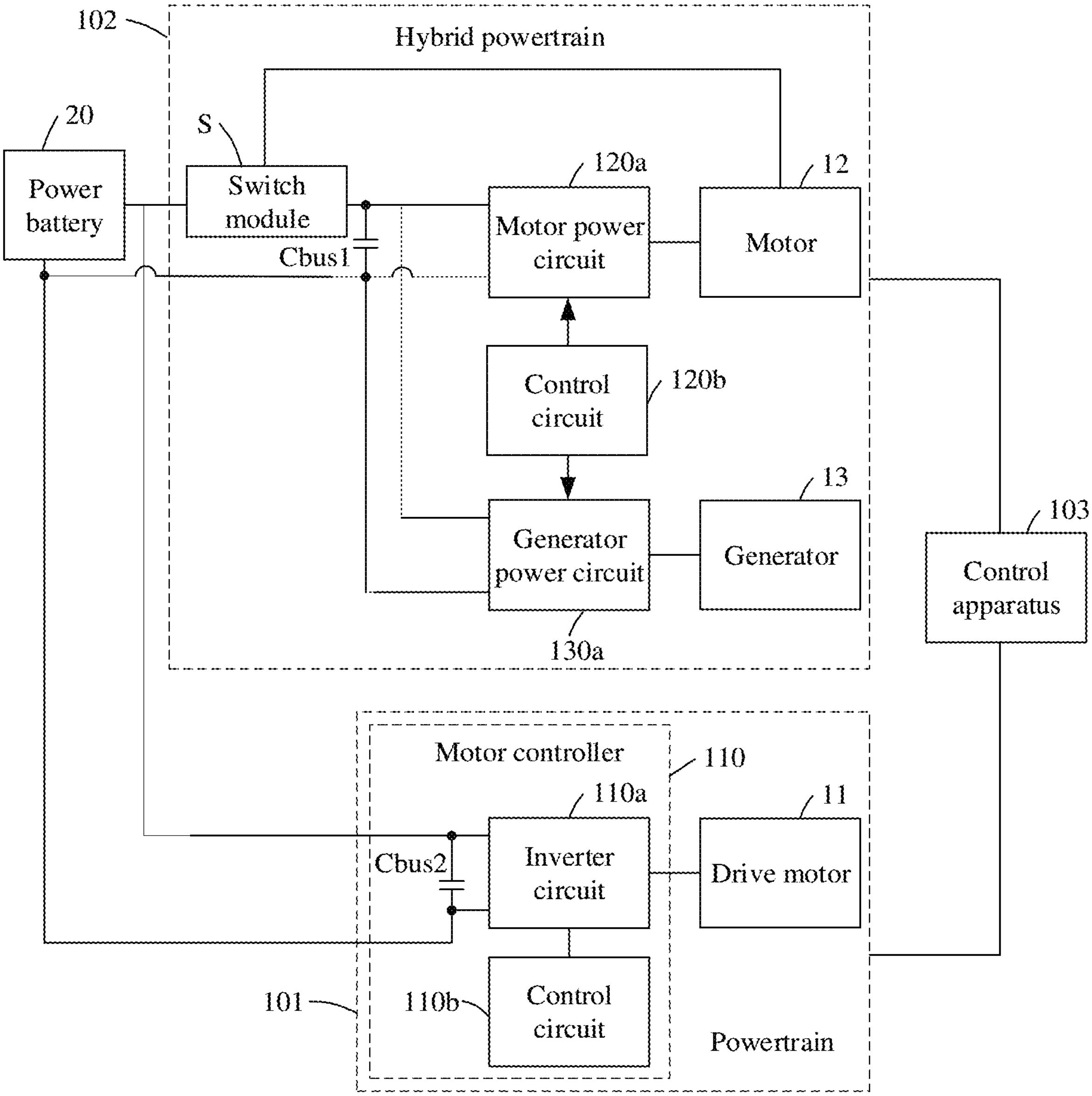
FIG. 2 is a diagram of a structure of a power system of an electric vehicle according to this application.

Further refer to FIG. 2. FIG. 2 is a diagram of the electric vehicle 01 according to this application. The electric vehicle 01 includes the powertrain 101, the hybrid powertrain 102, and a control apparatus 103. The powertrain 101 includes a drive motor 11 and a motor controller 110 configured to control the drive motor 11. The hybrid powertrain 102 includes a motor 12, a generator 13, a switch module S, and a dual-motor controller 120. The power battery 20 is electrically connected to the motor controller 110 and the dual-motor controller 120. The motor controller 110 includes an inverter circuit 110*a*, a bus capacitor Cbus2, and a control circuit 110*b*. The dual-motor controller 120 includes a motor power circuit 120*a*, a generator power circuit 130*a*, a bus capacitor Cbus1, and a control circuit 102*b*.

In an embodiment, the control apparatus 103 is configured to connect to the control circuit 110*b* and the control circuit 102*b*, and the control apparatus 103 is configured to send a control signal to the control circuit 102*b* and the control circuit 110*b*.

In an embodiment, the control apparatus 103 directly controls the motor power circuit 120*a* and the generator power circuit 130*a*.

In an embodiment, the control apparatus 103 is a vehicle control unit. In an embodiment, the control apparatus 103 is a domain control unit.

Figure 3:
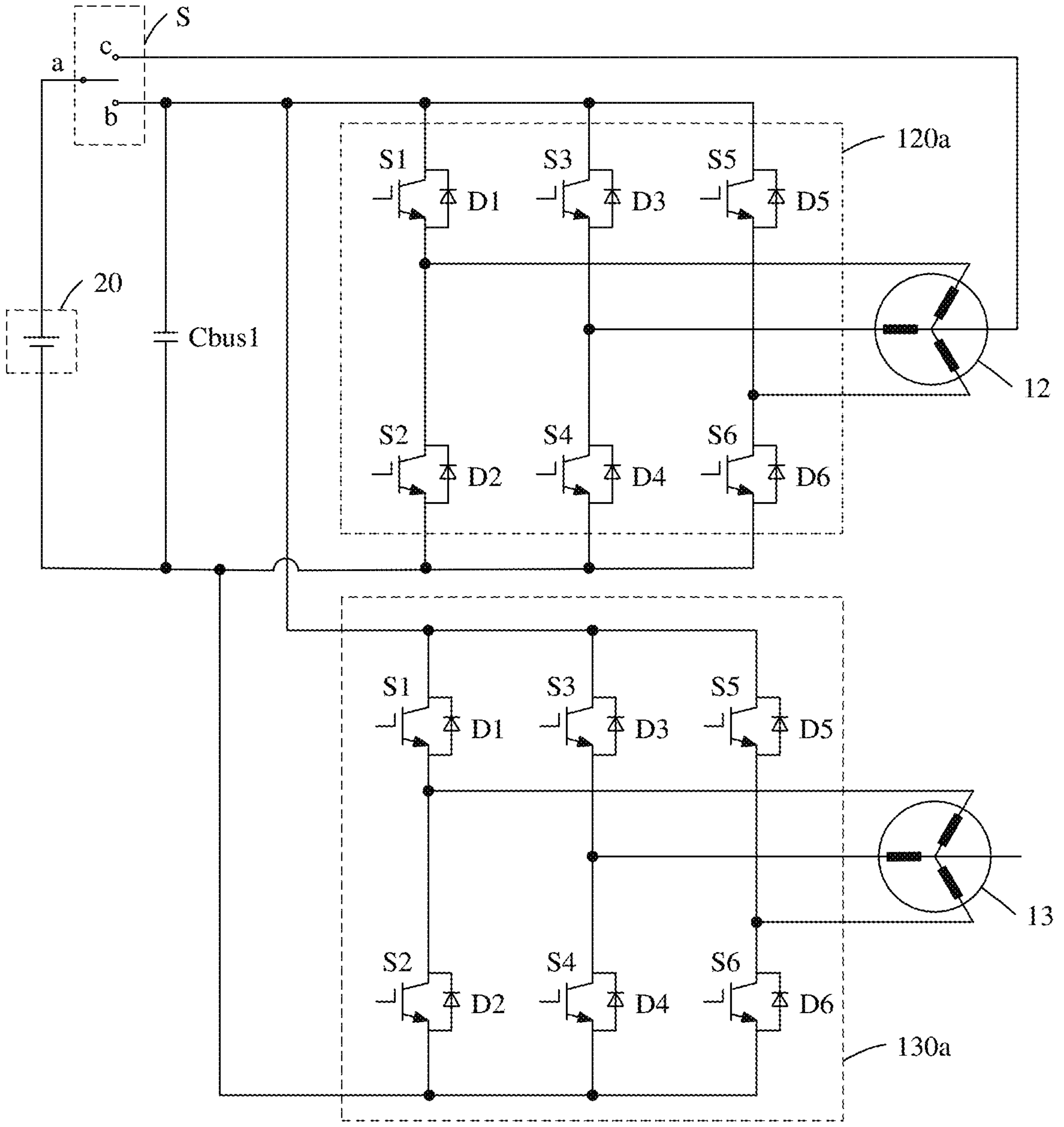
FIG. 3 is a diagram of a structure of a hybrid powertrain according to this application.

As shown in FIG. 3, the motor power circuit 120*a* includes a plurality of switching transistor bridge arms, and each switching transistor bridge arm includes an upper bridge arm switching transistor and a lower bridge arm switching transistor. Bridge arm midpoints of the plurality of switching transistor bridge arms are configured to connect to a multiphase winding of the motor 12. An end of each switching transistor bridge arm is configured to connect to an end of the bus capacitor Cbus1, and the other end of each switching transistor bridge arm is configured to connect to the other end of the bus capacitor Cbus1 and an end of the power battery 20.

The switch module S is configured to receive a switch module control signal output by the control circuit 102*b* in the dual-motor controller 120, to connect to the power battery 20 and the inverter circuit 110*a*, or connect to the power battery 20 and the motor 12.

If the switch module S runs in a first state, the switch module S is configured to connect to a center tap of the motor 12 and an end of the power battery 20. If the switch module S runs in a second state, the switch module S is configured to connect to an end of the plurality of bridge arms of the motor power circuit 120*a* and an end of the power battery 20.

In an embodiment, the switch module S is a single-pole double-throw switch. As shown in FIG. 3, the switch module S includes a moving contact a, a static contact b, and a static contact c. When the moving contact a is connected to the static contact b, the switch module S is in the first state. When the moving contact a is connected to the static contact c, the switch module S is in the second state.

Figure 4:
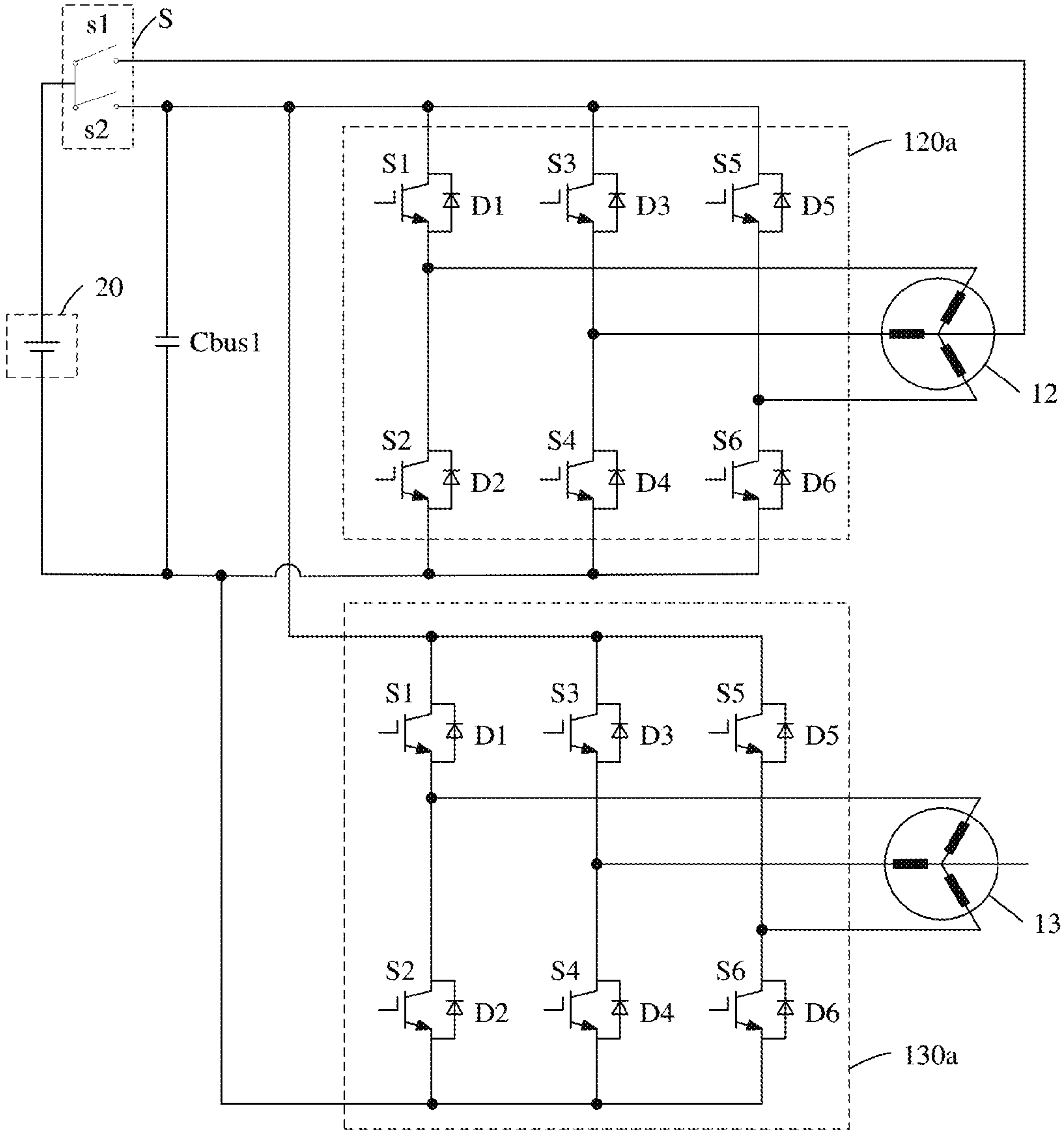
FIG. 4 is a diagram of another structure of a hybrid powertrain according to this application.

In an embodiment, as shown in FIG. 4, the switch module S includes a switch S1 and a switch S2. When the switch S1 is closed and the switch S2 is open, the switch module S is in a first state. When the switch S1 is open and the switch S2 is closed, the switch module is in a second state.

In an embodiment, the control apparatus 103 is configured to control a working status of the switch module S. The control apparatus 103 sends a switch control instruction to the circuit 102*b*, and the control circuit 102*b* outputs a switch control signal in response to the switch control instruction, where the switch control signal is used to control the switch module S to run in the first state or the second state.

In an embodiment, the control circuit 102*b* may alternatively be configured to directly control the switch module S.

In an embodiment, the switch module S includes a switch controller, and the switch controller is configured to control a running status of the switch module S.

In this embodiment of this application, the hybrid powertrain 102 is an auxiliary powertrain, and the powertrain 101 is a main powertrain. The motor 12 is a motor. In a traveling process of the electric vehicle 01, the powertrain 101 performs a main driving function, and the hybrid powertrain 102 cooperates with the main powertrain to output power. The powertrain 101 and the hybrid powertrain 102 cooperate with each other to drive the electric vehicle 01, so that power performance of the electric vehicle 01 can be enhanced, and both the two motors run in a highly efficient working range.

A running status of the hybrid powertrain 102 includes a driving state and a free wheeling state.

If the hybrid powertrain 102 is in the driving state, the hybrid powertrain 102 is configured to drive the wheels 30. Specifically, when the hybrid powertrain 102 runs in the driving state, the dual-motor controller 120 is configured to output a three-phase alternating current to the motor 12, to drive the motor 12 to output torque. When the hybrid powertrain 102 runs in the driving state, the hybrid powertrain 102 and the powertrain 101 jointly drive the electric vehicle 01.

If the hybrid powertrain 102 is in the free wheeling state, the motor 12 rotates with the wheels 30, the motor 12 does not output torque to the wheels 30, and the dual-motor controller 120 does not output a three-phase alternating current. When the hybrid powertrain 102 runs in the free wheeling state, the switching transistor of the motor power circuit 120*a* is turned off, the motor 12 rotates with the wheels, and the powertrain 101 independently drives the electric vehicle 01.

In the traveling process of the electric vehicle 01, the motor 12 cooperates with the drive motor 11 to drive the wheels 30 and the wheels 40 of the electric vehicle. The dual-motor controller 120 is configured to control a torque output of the motor 12, and the dual-motor controller 120 includes the motor power circuit 120*a* including the plurality of switching transistor bridge arms. If the hybrid powertrain 102 is in the driving state, upper bridge arm switching transistors and lower bridge arm switching transistors of the plurality of switching transistor bridge arms of the motor power circuit 120*a* are alternately turned on, and the motor power circuit 120*a* is configured to convert a direct current from the power battery 20 into an alternating current to drive the motor 12 to output torque. If the hybrid powertrain 102 is in the free wheeling state, a plurality of switching transistors of the motor power circuit 120*a* are turned off, the motor power circuit 120*a* does not output a drive current, and the motor 12 rotates with the wheels.

The hybrid powertrain 102 provided in this embodiment of this application further includes the generator 13 and the generator power circuit 130*a*. The generator power circuit 130*a* includes a plurality of switching transistor bridge arms, and each switching transistor bridge arm includes an upper bridge arm switching transistor and a lower bridge arm switching transistor. The generator 13 includes a multiphase winding, and a bridge arm midpoint of each switching transistor bridge arm of the generator power circuit 130*a* is configured to connect to a one-phase winding of the generator 13. Two ends of the plurality of switching transistor bridge arms of the generator power circuit 130*a* are configured to connect to two ends of the bus capacitor Cbus1. When electricity of the power battery 20 is low, the generator 13 is configured to generate power to generate an alternating current, and the generator power circuit 130*a* is configured to convert the alternating current from the generator 13 into a direct current and charge the power battery 20 by using the bus capacitor Cbus1.

In an embodiment, the drive motor 11 is a permanent-magnet synchronous motor, and the motor 12 is an induction motor. The drive motor 11 is a main drive motor, and the permanent-magnet synchronous motor has advantages of high motor power density, high energy conversion efficiency, and low energy consumption. The main drive motor is set as the permanent-magnet synchronous motor, so that the power performance of the electric vehicle 01 can be improved and energy can be saved. The motor 12 is an auxiliary drive motor, and the induction motor has advantages of high reliability and low costs. The auxiliary drive motor is set as the induction motor, so that reliability of a power system of the electric vehicle 01 can be improved, and costs of the power system of the electric vehicle 01 can be reduced.

In an embodiment, both the drive motor 11 and the motor 12 are induction motors. The drive motor 11 and the motor 12 are both set as induction motors, so that reliability of a power system of the electric vehicle 01 can be improved, and costs of the power system of the electric vehicle 01 can be reduced.

Figure 5:
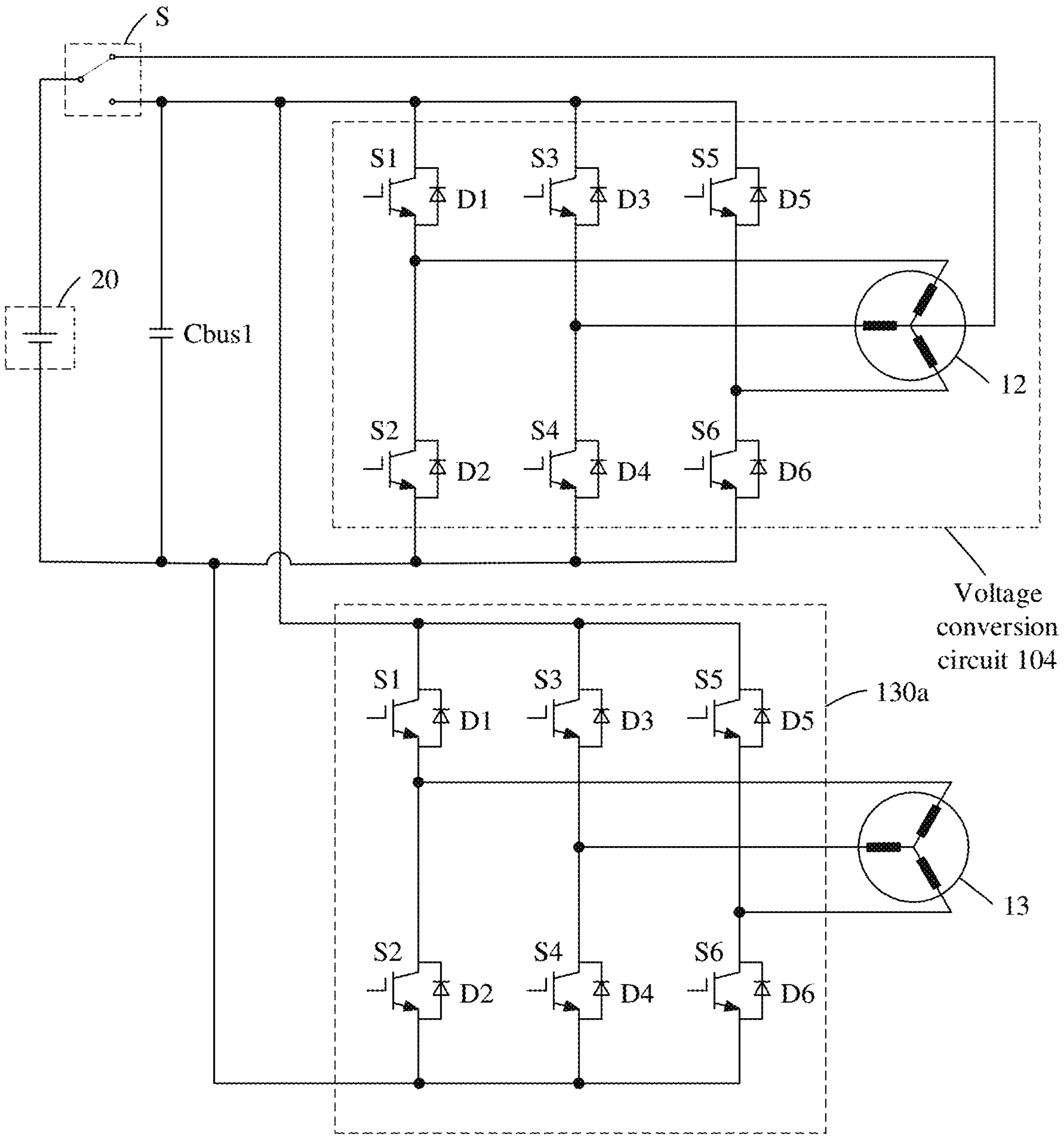
FIG. 5 is a running diagram of a hybrid powertrain according to this application.

In this embodiment of this application, as shown in FIG. 5, in response to that the motor 12 rotates with the wheels and the switch module S runs in the first state, the switch module S is configured to connect to the center tap of the motor 12 and the end of the power battery 20, and the multiphase winding of the motor 12 and a plurality of switching transistor bridge arms of the dual-motor controller 120 form a voltage conversion circuit 104.

The motor 12 rotates with the wheels 40, that is, the plurality of switching transistor bridge arms of the motor power circuit 120*a* do not need to output a drive current to the motor 12. In this case, the switch module S is connected to the center tap of the motor 12 and the end of the power battery 20, so that the plurality of bridge arms of the motor power circuit 120*a* and the multiphase winding of the motor 12 form a voltage conversion circuit 104. The voltage conversion circuit 104 is configured to adjust a voltage between the two ends of the bus capacitor Cbus1.

The following describes in detail, with reference to specific embodiments, a specific process in which the voltage conversion circuit 104 is configured to adjust the voltage between the two ends of the bus capacitor Cbus1.

In this embodiment of this application, in response to that an output voltage of the power battery 20 is less than a preset voltage value and the motor 12 rotates with the wheels 40, the voltage conversion circuit 104 is configured to increase the voltage between the two ends of the bus capacitor Cbus1.

In the electric vehicle 01, the drive motor 11 is the main drive motor, and the motor 12 is the auxiliary drive motor. In the traveling process of the electric vehicle 01, the drive motor 11 is a main power source, and the motor 12 cooperates with the drive motor 11 to provide power for the electric vehicle 01. The electricity of the power battery 20 is continuously consumed, causing the output voltage of the power battery 20 to decrease. The output voltage of the power battery 20 decreases, causing a working voltage of the drive motor 11 to decrease. Consequently, working efficiency and an output power of the drive motor 11 decrease, and the power performance and entire vehicle endurance mileage of the electric vehicle 01 are affected. According to the dual-motor controller 120 provided in this embodiment of this application, when the output voltage of the power battery 20 is insufficient, the plurality of switching transistor bridge arms of the motor power circuit 120*a* and the multiphase winding of the motor 12 form a boost (boost) circuit, and the boost circuit boosts the voltage between the two ends of the bus capacitor Cbus1. Because the bus capacitor Cbus1 of the hybrid powertrain 102 and the bus capacitor Cbus2 of the powertrain 101 are connected in parallel, when the voltage between the two ends of the bus capacitor Cbus1 increases, a voltage between two ends of the bus capacitor Cbus2 increases accordingly, so that the drive motor 11 is under a higher working voltage. In this way, the working efficiency and the output power of the drive motor 11 can be improved, and entire vehicle endurance and the power performance of the electric vehicle 01 can be improved.

In an embodiment, the voltage conversion circuit 104 responds to a case in which the output voltage of the power battery 20 is less than the preset voltage value and the motor 12 rotates with the wheels 40, and at least one lower bridge arm switching transistor of the switching transistor bridge arms of the voltage conversion circuit 104 is turned on at a preset duty cycle in each switch cycle, to increase the voltage between the two ends of the bus capacitor Cbus1.

Figure 6A:
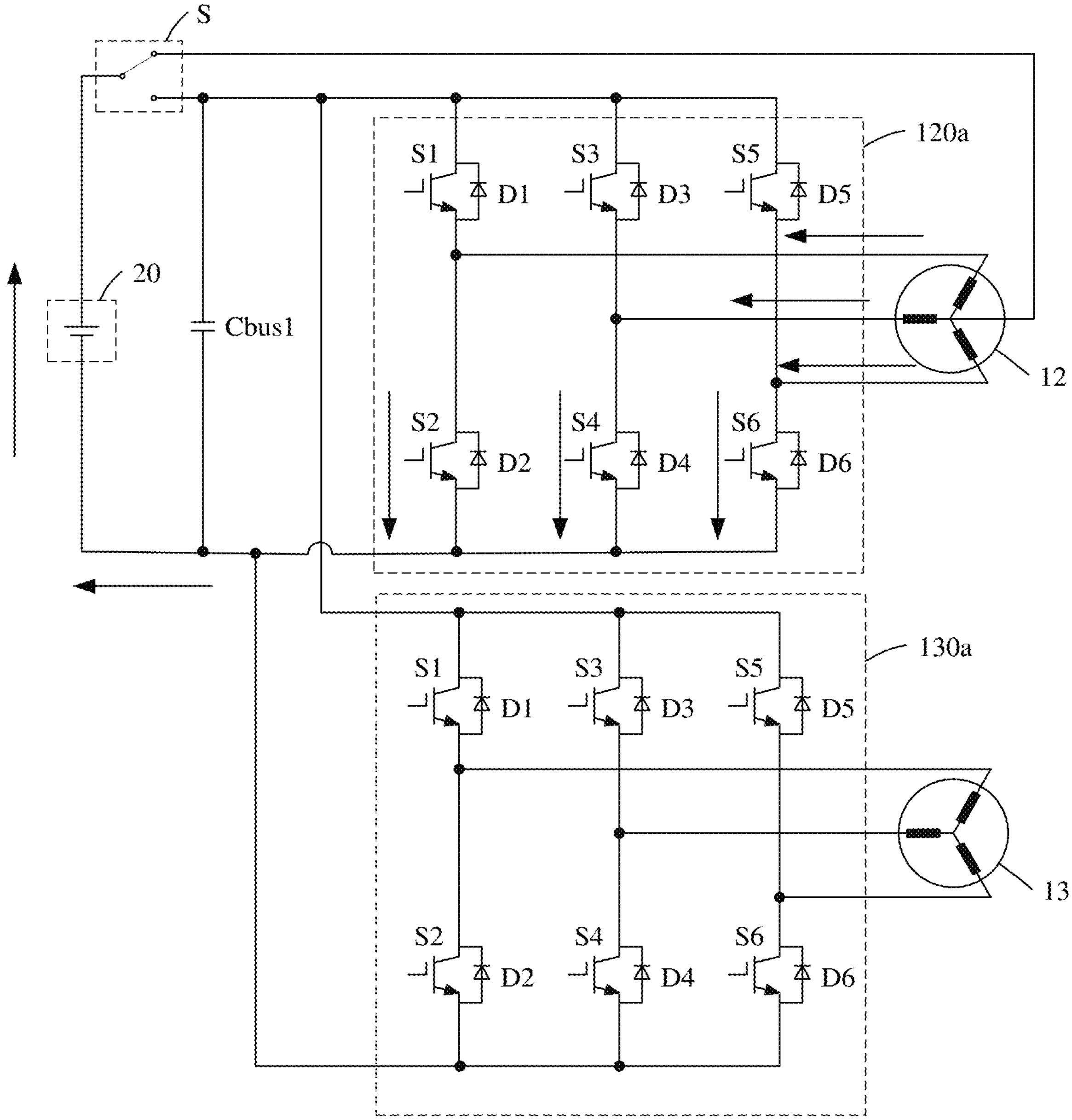
FIG. 6A is another running diagram of a hybrid powertrain according to this application.

Specifically, for the at least one lower bridge arm switching transistor of the switching transistor bridge arms, each switch cycle is divided into two stages. At a moment T1, the at least one lower bridge arm switching transistor of the motor power circuit 120*a* is turned on, and the power battery 20 is configured to charge an inductor that is of a winding of the motor 12 and that is connected to a bridge arm corresponding to the lower bridge arm switching transistor in a turned-on state. In an embodiment, as shown in FIG. 6A, at the moment T1, three lower bridge arm switching transistors of the bridge arms of the motor power circuit 120*a* are turned on, and a current flowing from a positive electrode of the power battery 20 sequentially flows through a three-phase winding of the motor 12 and the three lower bridge arm switching transistors of the motor power circuit 120*a*, and finally flows back to a negative electrode of the power battery 20. In this process, the power battery 20 is configured to charge an inductor of the three-phase winding of the motor 12.

Figure 6B:
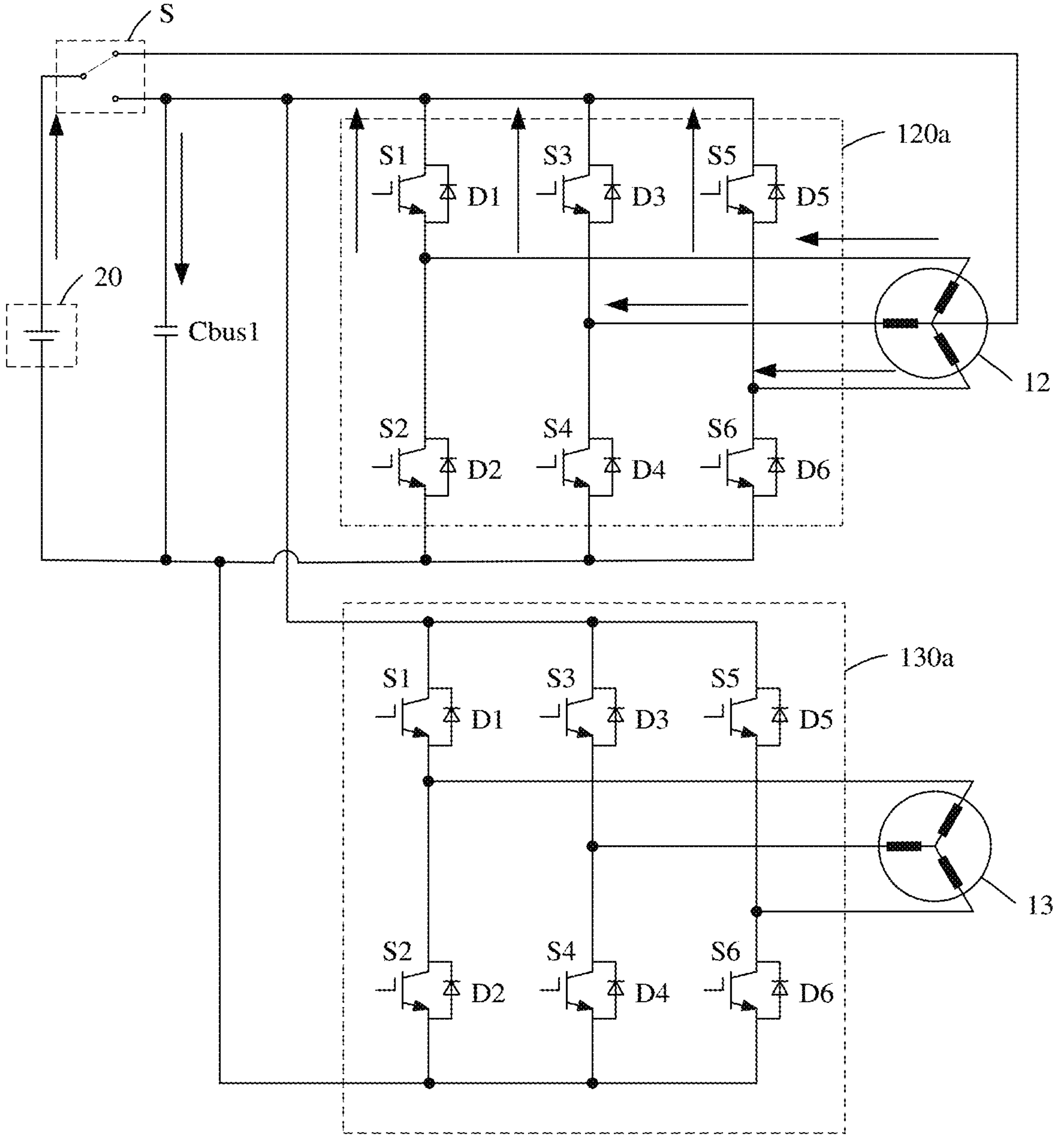
FIG. 6B is another running diagram of a hybrid powertrain according to this application.

At a moment T2, the lower bridge arm switching transistor of the motor power circuit 120*a* is turned off, and the power battery 20 and the charged winding of the motor 12 are jointly configured to charge the bus capacitor Cbus1, to increase the voltage between the two ends of the bus capacitor Cbus1. In an embodiment, as shown in FIG. 6B, at the moment T2, the lower bridge arm switching transistor of the motor power circuit 120*a* is turned off, and a current flowing from the positive electrode of the power battery 20 sequentially flows through the three-phase winding of the motor 12, freewheeling diodes D1, D2, and D3, and the bus capacitor Cbus1, and finally flows back to the negative electrode of the power battery 20. In this process, the three-phase windings of the motor 12 and the power battery 20 jointly charge the bus capacitor Cbus1. The voltage between the two ends of the bus capacitor Cbus1 is a result obtained through superposition of a voltage of the power battery 20 and a voltage of the three-phase winding of the motor 12, so that the voltage between the two ends of the bus capacitor Cbus1 is greater than the output voltage of the power battery 20.

In an embodiment, the voltage conversion circuit 104 responds to a case in which the output voltage of the power battery 20 is less than the preset voltage value and the motor 12 rotates with the wheels 40, and at least one upper bridge arm switching transistor and at least one lower bridge arm switching transistor of the switching transistor bridge arms of the voltage conversion circuit 104 are alternately turned on.

Specifically, at a moment T1, the at least one lower bridge arm switching transistor of the motor power circuit 120*a* is turned on, and the power battery 20 is configured to charge an inductor that is of a winding of the motor 12 and that is connected to a bridge arm corresponding to the lower bridge arm switching transistor in a turned-on state. A specific principle of this process is described above, and details are not described herein again.

At a moment T2, the at least one lower bridge arm switching transistor of the motor power circuit 120*a* is turned off, and an upper bridge arm switching transistor corresponding to the lower bridge arm switching transistor is turned on. The winding of the motor 12 and the power battery 20 jointly charge the bus capacitor Cbus1, so that the voltage between the two ends of the bus capacitor Cbus1 is greater than the output voltage of the power battery 20.

For example, at the moment T1, a switching transistor S2 is turned on, and a current flows from a positive electrode of the power battery 20, sequentially flows through a U-phase winding of the drive motor and the switching transistor S2, and finally flows back to a negative electrode of the power battery 20. In this process, the power battery 20 charges the U-phase winding of the motor 12. At the moment T2, the switching transistor S2 is turned off, a switching transistor S1 is turned on, and a current flows from the positive electrode of the power battery 20, sequentially flows through the U-phase winding of the motor 12, the switching transistor S1, and the bus capacitor Cbus1, and finally flows back to the negative electrode of the power battery 20. In this process, the power battery 20 and the U-phase winding of the drive motor jointly charge the bus capacitor Cbus1, so that the voltage between the two ends of the bus capacitor Cbus1 is greater than the output voltage of the power battery 20.

In an embodiment, in response to that the output voltage of the power battery 20 is less than the preset voltage value, the dual-motor controller controls the generator 13 to output an alternating current.

Specifically, in a scenario in which the voltage between the two ends of the bus capacitor Cbus1 is low, in response to that the output voltage of the power battery 20 is less than the preset voltage value, a generator controller 130 in the dual-motor controller may control the generator 13 to output the alternating current, and charge the bus capacitor Cbus1 by using the generator power circuit 130*a*, so that the voltage between the two ends of the bus capacitor Cbus1 is greater than the output voltage of the power battery 20.

In an embodiment, the generator 13 and the drive motor 11 may operate independently when the output voltage of the power battery 20 is low. Specifically, the dual-motor controller 120 may control the voltage conversion circuit 104 to increase the voltage between the two ends of the bus capacitor Cbus1, and the generator controller 130 may also control the generator 13 to output the alternating current to increase the voltage between the two ends of the bus capacitor Cbus1. The foregoing two manners of increasing the voltage between the two ends of the bus capacitor Cbus1 may be simultaneously implemented, or either of the two manners may be implemented. This is not limited in this application.

With reference to specific embodiments, a case is described above: When the output voltage of the power battery 20 is low in a torque output process of the drive motor 11, the dual-motor controller 120 and the motor 12 are configured to increase the voltage between the two ends of the bus capacitor Cbus1, to increase the voltage between the two ends of the bus capacitor Cbus2, so that the drive motor 11 runs at a high working voltage.

The dual-motor controller 120 calculates, based on the output voltage of the power battery 20, a preset rotation speed value that enables the drive motor 11 to run in a highly efficient range at a current output voltage of the power battery 20. If a rotation speed value indicated by a rotation speed signal is greater than the preset rotation speed value, it indicates that it is difficult for a current output voltage of the power battery 20 to enable the drive motor 11 to run in the highly efficient range. Similarly, if a rotation speed value indicated by a torque signal is greater than a preset torque value, it indicates that it is difficult for a current output voltage of the power battery 20 to enable the drive motor 11 to run in the highly efficient range. Therefore, in an embodiment, in response to that the motor 12 rotates with the pair of wheels 40, and a target torque value of the drive motor 11 is greater than the preset torque value or a target rotation speed value of the drive motor 11 is greater than the preset rotation speed value, at least one lower bridge arm switching transistor of the switching transistor bridge arms of the voltage conversion circuit 104 is turned on at a preset duty cycle in each switch cycle, or at least one upper bridge arm switching transistor and at least one lower bridge arm switching transistor of the switching transistor bridge arms of the voltage conversion circuit 104 are alternately turned on, to increase the voltage between the two ends of the bus capacitor Cbus1.

The dual-motor controller 120 responds to a case in which the target torque value of the drive motor 11 is greater than the preset torque value or the target rotation speed value of the drive motor 11 is greater than the preset rotation speed value, and the motor 12 rotates with the wheels 40, and the dual-motor controller 120 controls the at least one lower bridge arm switching transistor of the switching transistor bridge arms of the voltage conversion circuit 104 to be turned on at the preset duty cycle in each switch cycle, or controls the at least one upper bridge arm switching transistor and the at least one lower bridge arm switching transistor of the switching transistor bridge arms of the voltage conversion circuit 104 to be alternately turned on, to increase the voltage between the two ends of the bus capacitor Cbus1. A specific boosting process is described above, and details are not described herein again.

A running status of the drive motor 11 includes a driving state and a power generation state. If the drive motor 11 runs in the driving state, the drive motor 11 is configured to convert electric energy of the power battery 20 into kinetic energy of the electric vehicle 01. If the drive motor 11 runs in the power generation state, the drive motor 11 is configured to convert kinetic energy of the electric vehicle 01 into electric energy to charge the power battery 20. For example, in a braking process of the electric vehicle 01, the drive motor 11 runs in the power generation state, the drive motor 11 converts the kinetic energy of the electric vehicle into a high-voltage alternating current, and the motor controller 110 converts the high-voltage alternating current into a direct current and charges the power battery 20 by using the bus capacitor Cbus2. Because the bus capacitor Cbus2 and the bus capacitor Cbus1 are connected in parallel, the voltage between the two ends of the bus capacitor Cbus2 is equal to the voltage between the two ends of the bus capacitor Cbus1.

With reference to specific embodiments, a case is described above: When the voltage between the two ends of the bus capacitor Cbus1 is excessively high in the torque output process of the drive motor 11, the dual-motor controller 120 and the drive motor 11 are configured to reduce the voltage between the two ends of the bus capacitor Cbus1, to reduce the voltage between the two ends of the bus capacitor Cbus2, so that the power battery 20 receives electric energy generated by the drive motor 11.

In this embodiment of this application, the voltage conversion circuit 104 responds to a case in which the drive motor 11 rotates with the wheels 30 to generate an induced current, the voltage between the two ends of the bus capacitor Cbus1 is greater than a preset value, and the motor 12 rotates with the wheels, and the voltage conversion circuit 104 is configured to reduce the voltage between the two ends of the bus capacitor Cbus1.

In this embodiment of this application, when the drive motor 11 runs in the power generation state, the drive motor 11 rotates with the wheels 30 to generate an induced current. In this process, the drive motor 11 converts kinetic energy of the electric vehicle 01 into electric energy for output. The motor controller 110 is configured to receive an alternating current generated by the drive motor 11 and convert the alternating current into a direct current. The power battery 20 receives the direct current from the motor controller 110 by using the bus capacitor Cbus2. If a voltage of the direct current generated by the motor controller 110 is excessively high, there is negative impact on performance of the power battery 20. In this case, the voltage of the direct current from the motor controller 110 needs to be reduced before the power battery 20 is charged.

In an embodiment, in a process in which the drive motor 11 rotates with the wheels 30 to generate an induced current, the voltage conversion circuit 104 responds to a case in which the voltage between the two ends of the bus capacitor Cbus1 is greater than the preset value, and at least one upper bridge arm switching transistor of the voltage conversion circuit 104 is turned on at a preset duty cycle in each switch cycle to reduce the voltage between the two ends of the bus capacitor Cbus1, to reduce the voltage between the two ends of the bus capacitor Cbus2.

Figure 7A:
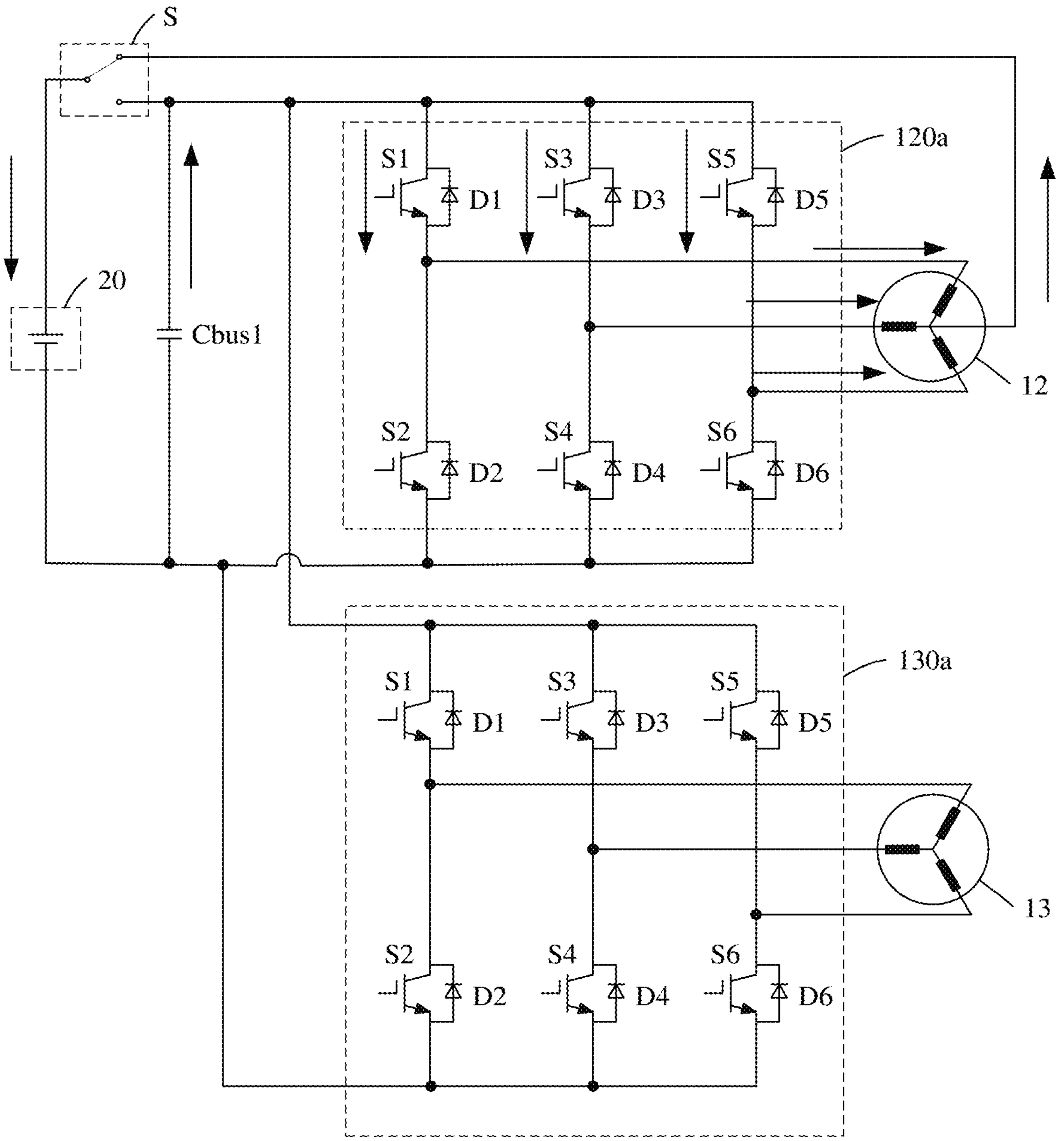
FIG. 7A is another running diagram of a hybrid powertrain according to this application.

Specifically, for the at least one upper bridge arm switching transistor of the switching transistor bridge arms, each switch cycle may be divided into a turn-on stage and a turn-off stage. At a moment T1, the at least one upper bridge arm switching transistor of the motor power circuit 120*a* is turned on, and the bus capacitor Cbus1 is configured to charge an inductor that is of a winding of the motor 12 and that is connected to a bridge arm corresponding to the upper bridge arm switching transistor in the turned-on state and charge the power battery 20. In an embodiment, as shown in FIG. 7A, at the moment T1, three upper bridge arm switching transistors of the bridge arms of the motor power circuit 120*a* are turned on, and a current flowing from the bus capacitor Cbus1 sequentially flows through the three upper bridge arm switching transistors of the motor power circuit 120*a*, a three-phase winding of the motor 12, and the power battery 20, and finally flows back to the bus capacitor Cbus1. In this process, the bus capacitor Cbus1 is configured to charge an inductor of the three-phase winding of the motor 12 and the power battery 20. Therefore, a charging voltage of the power battery 20 is less than the voltage between the two ends of the bus capacitor Cbus1.

Figure 7B:
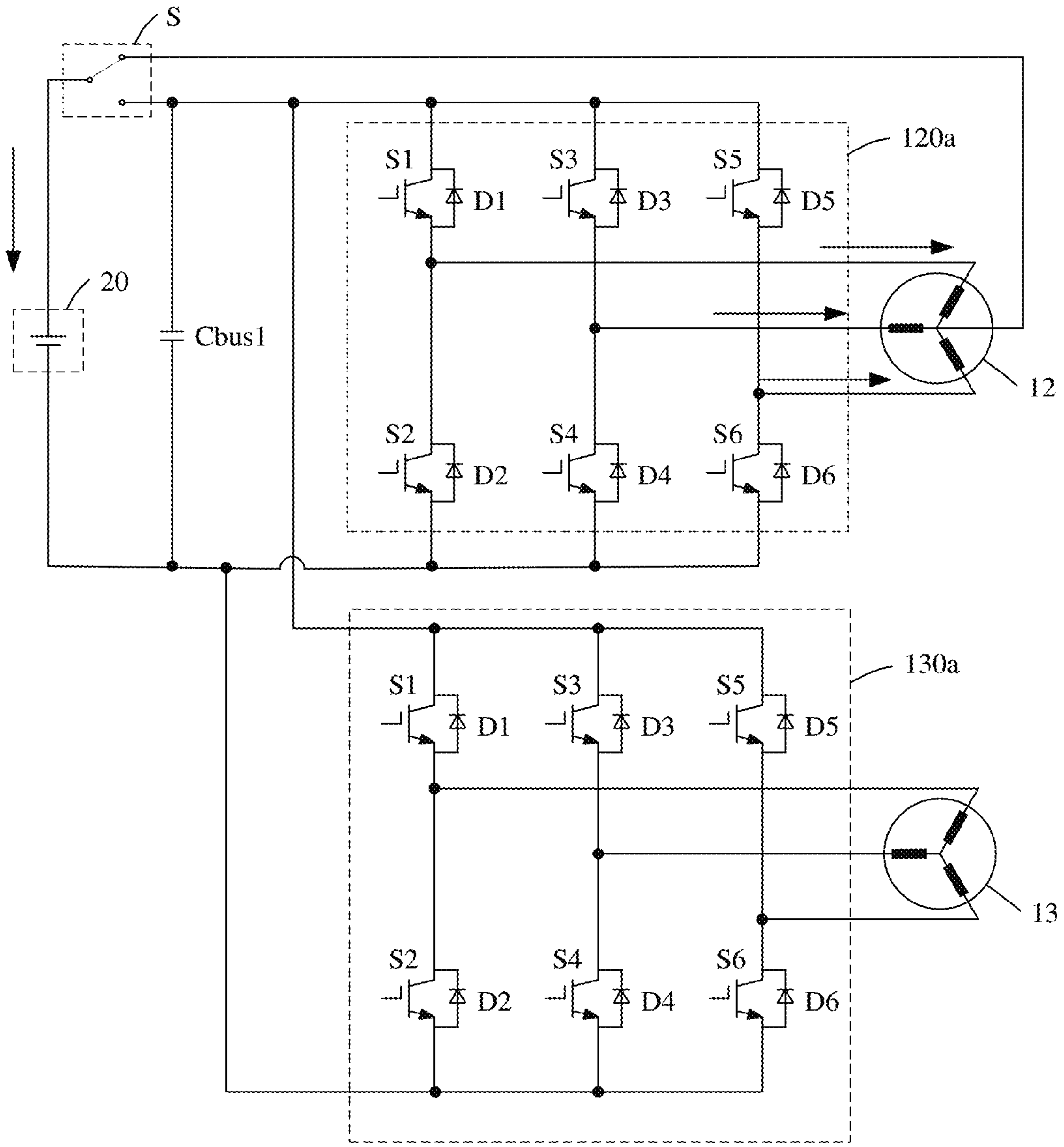
FIG. 7B is another running diagram of a hybrid powertrain according to this application.
Figure 8:
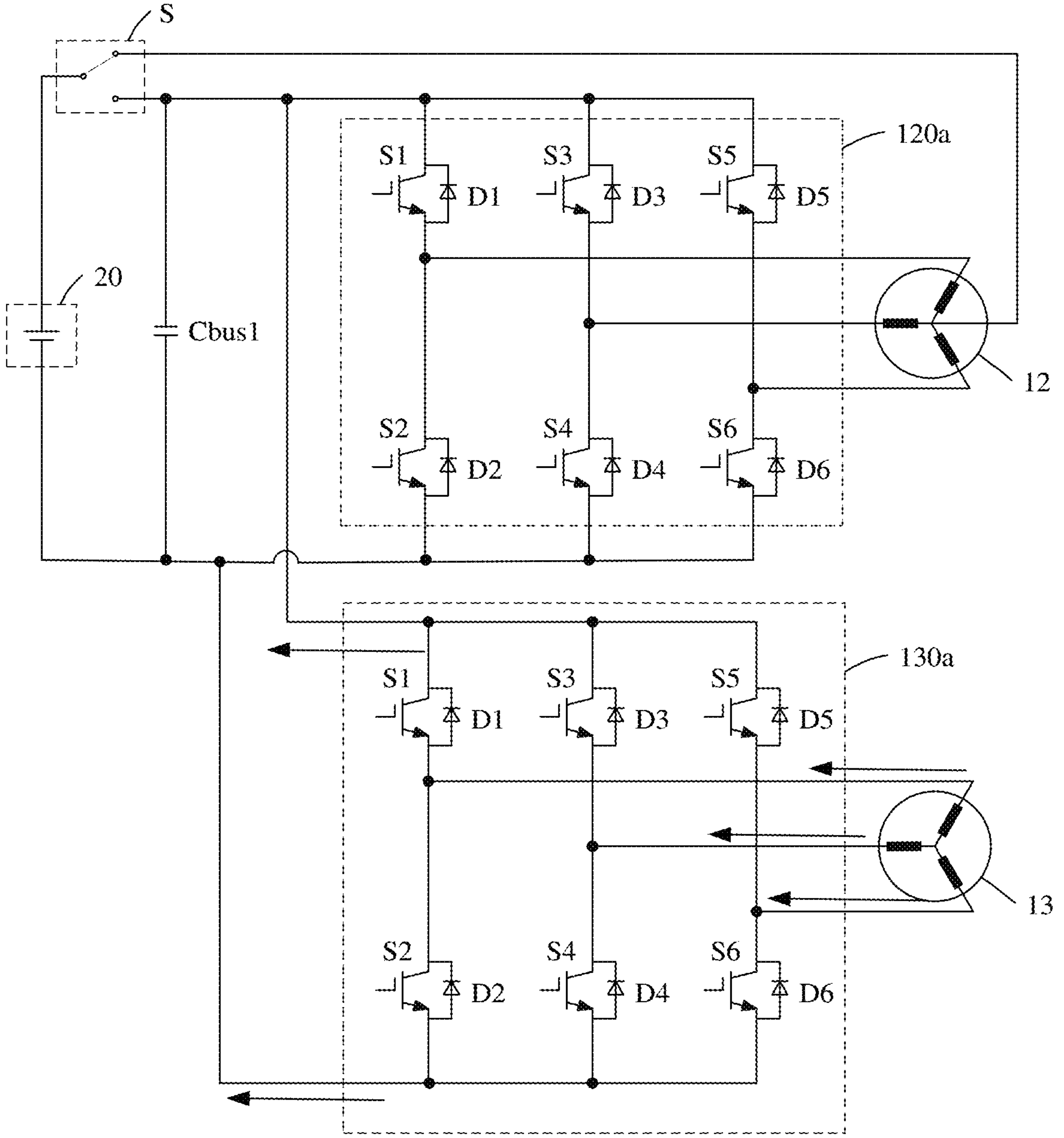
FIG. 8 is another running diagram of a hybrid powertrain according to this application.

At a moment T2, the upper bridge arm switching transistor of the motor power circuit 120*a* is turned off, and the charged winding of the motor 12 is configured to charge the power battery 20. In an embodiment, as shown in FIG. 7B, at the moment T2, the upper bridge arm switching transistor of the motor power circuit 120*a* is turned off, and a current flowing from the three-phase winding of the motor 12 sequentially flows through the power battery 20, freewheeling diodes D1, D2, and D3, and the bus capacitor Cbus1, and finally flows back to the three-phase winding of the motor 12. In this process, the three-phase winding of the motor 12 is configured to charge the power battery 20. Because a voltage of the winding of the drive motor 12 is less than the voltage between the two ends of the bus capacitor Cbus1, in this process, a charging voltage of the power battery 20 is less than the voltage between the two ends of the bus capacitor Cbus1.

In an embodiment, the voltage conversion circuit 104 responds to a case in which the drive motor 11 rotates with the wheels 30 to generate an induced current, the voltage between the two ends of the bus capacitor Cbus1 is greater than the preset value, and the motor 12 rotates with the wheels 40, and at least one upper bridge arm switching transistor and at least one lower bridge arm switching transistor of the bridge arms of the voltage conversion circuit 104 are alternately turned on.

Specifically, at the moment T1, the at least one upper bridge arm switching transistor of the switching transistor bridge arms of the motor power circuit 120*a* is turned on, and the bus capacitor Cbus1 charges the power battery 20 by sequentially using the at least one upper bridge arm switching transistor of the bridge arms, a winding connected to a bridge arm midpoint corresponding to the turned-on switching transistor. In this process, the bus capacitor Cbus1 charges the winding of the motor 12, and the winding of the motor 12 performs voltage division. Therefore, a charging voltage of the power battery 20 is less than the voltage between the two ends of the bus capacitor Cbus1. A specific principle of this process is described above, and details are not described herein again.

At a moment T2, the at least one upper bridge arm switching transistor of the motor power circuit 120*a* is turned off, and a lower bridge arm switching transistor corresponding to the upper bridge arm switching transistor is turned on. The winding of the motor 12 charges the power battery 20, so that a charging voltage of the power battery 20 is less than the voltage between the two ends of the bus capacitor Cbus1.

For example, at the moment T1, a switching transistor S1 is turned on, and a current flows from the bus capacitor Cbus1, sequentially flows through a U-phase winding of the drive motor and the power battery 20, and finally flows back to the bus capacitor Cbus1. In this process, the bus capacitor Cbus1 charges the U-phase winding of the motor 12 and the power battery 20. At the moment T2, the switching transistor S1 is turned off, a switching transistor S2 is turned on, and a current flows from the U-phase winding of the motor 12, flows through the power battery 20, and finally flows back to the U-phase winding of the motor 12. In this process, the U-phase winding of the motor 12 is configured to charge the power battery 20.

In this embodiment of this application, when the output voltage of the power battery 20 is less than the preset voltage value, the voltage conversion circuit 104, the generator power circuit 130*a*, and the generator 13 are jointly configured to increase the voltage between the two ends of the bus capacitor Cbus1. Specifically, the voltage conversion circuit 104*a* is configured to increase the voltage between the two ends of the bus capacitor Cbus1. In addition, the generator 13 generates power to generate an alternating current, and the generator power circuit 130*a* is configured to convert the alternating current generated by the generator 13 into a direct current and charge the power battery 20 by using the bus capacitor Cbus1. In this case, the generator power circuit 130*a* and the motor power circuit 120*a* jointly increase the voltage between the two ends of the bus capacitor Cbus1.

In this embodiment of this application, in response to a first torque signal, the switch module S is configured to connect to the end of the power battery 20 and the end of the plurality of switching transistor bridge arms, and the plurality of bridge arm midpoints of the motor power circuit 120*a* output alternating currents to drive the motor 12 to output torque, where a torque value indicated by the first torque signal is greater than a preset torque value.

In an embodiment, the first torque signal is sent by the vehicle control unit. The dual-motor controller 120 controls, in response to the first torque signal, the switch module S to connect to the end of the power battery 20 and the end of the plurality of switching transistor bridge arms, and controls the plurality of bridge arm midpoints of the motor power circuit 120*a* to output the alternating currents.

When the motor 12 rotates with the wheels, the bridge arms of the dual-motor controller 120 and the three-phase winding of the motor 12 form the voltage conversion circuit to adjust the voltage between the two ends of the bus capacitor. However, in a running process of the electric vehicle 01, to obtain better power performance, the motor 12 also needs to output torque under a specific working condition. In this case, a vehicle control unit 50 outputs a first torque signal, the dual-motor controller 120 receives the first torque signal and controls the switch module S to be in the second state, and bridge arm midpoints of the plurality of bridge arms of the dual-motor controller 120 output a three-phase alternating current, so that the motor 12 outputs torque indicated by the first torque signal.

Figure 9:
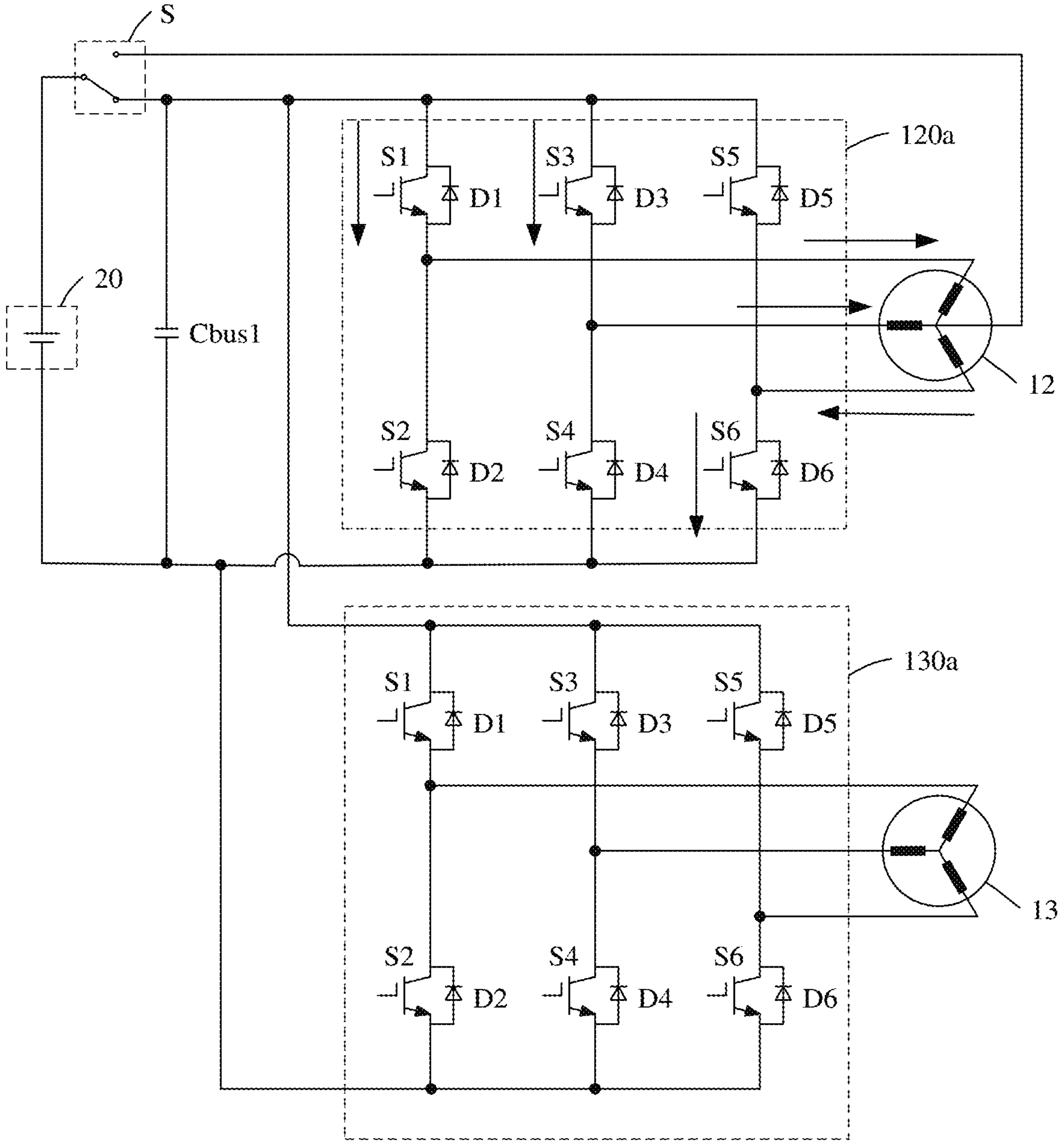
FIG. 9 is another running diagram of a hybrid powertrain according to this application.

Refer to FIG. 9. FIG. 9 is a diagram of a current of a dual-motor controller 120 in response to a first torque signal according to this application. In an embodiment, when the dual-motor controller 120 receives the first torque signal, the control circuit 102*b* outputs the switch control signal, to control the switch module S to be in the second state. The switch module S is not specifically shown herein. The motor power circuit 120*a* is controlled to output an alternating current to the motor 12, so that the auxiliary drive motor 12 outputs corresponding torque. A phase difference between output currents of three switching transistor bridge arms of the motor power circuit 120*a* is 120 degrees from each other, and a vector sum of the output currents of the three switching transistor bridge arms is zero.

In this embodiment of this application, in response to a second torque signal, switching transistors of the plurality of switching transistor bridge arms of the motor power circuit 120*a* are turned off to save energy. A torque value indicated by the second torque signal is less than a preset torque value.

In a case in which neither the motor 12 needs to output torque nor the motor power circuit 120*a* and the multiphase winding of the motor 12 need to form a voltage conversion circuit to adjust the voltage between the two ends of the bus capacitor Cbus1, the switching transistors of the motor power circuit 120*a* are turned off to save energy.

The second torque signal may be understood as a zero torque output signal, and the second torque signal is used to control the hybrid powertrain 102 to output zero torque. In the traveling process of the electric vehicle 01, a vehicle control unit 50 outputs a second torque signal, so that the motor 12 is in a free wheeling state in which the motor 12 rotates with the wheels. A torque value indicated by the second torque signal is a zero torque value or an extremely small torque value less than the preset torque value.

For example, the preset torque value is 0.5 N·m. If a torque value indicated by a torque signal is less than or equal to 0.5 N·m, the powertrain 20 is in the free wheeling state, and an asynchronous motor 22 rotates with the wheels.

The dual-motor controller 120 provided in this embodiment of this application turns off the switching transistors of the motor power circuit 120*a* when receiving a zero torque signal, so that energy can be saved, and the entire vehicle endurance of the electric vehicle 01 can be improved.

The electric vehicle 01 in this embodiment of this application includes the powertrain 101 and the hybrid powertrain 102. The control apparatus 103 is configured to implement cooperation between the powertrain 101 and the hybrid powertrain 102.

In an embodiment, the control apparatus 103 responds to a case in which the motor 12 is configured to rotate with the wheels 40, and the control apparatus 103 is configured to control the switch module S to run in the first state, so that the multiphase winding of the motor 12 and a multiphase bridge arm of the motor power circuit 120*a* form a voltage conversion circuit.

Specifically, the dual-motor controller 120 is configured to control a running status of the motor 12 based on an instruction of the vehicle control unit 50. The vehicle control unit 50 outputs the second torque signal to the dual-motor controller 120. The control circuit 102*b* controls, in response to the second torque signal, the motor power circuit 120*a* not to output a drive current to the motor 12. In this case, the motor 12 does not actively output torque but rotates with the wheels 40. The control circuit 102*b* sends a running status signal of the motor 12 to the control apparatus 103. The control apparatus 103 controls the control circuit 102*b* to output the switch module control signal, where the switch module control signal is used to control the switch module S to run in the first state. The plurality of bridge arms of the dual-motor controller 120 and the multiphase winding of the motor 12 form a voltage conversion circuit.

The control apparatus 103 may alternatively be configured to directly control the switch module S, the control circuit 102*b*, and the control circuit 110*b*. In an embodiment, the control apparatus 103 responds to a case in which the drive motor 11 is configured to output torque, the motor 12 rotates with the wheels, and the voltage between the two ends of the bus capacitor Cbus1 of the dual-motor controller 120 is less than the preset value, and the control apparatus 103 is configured to: control at least one lower bridge arm switching transistor of the bridge arms of the motor power circuit 120*a* to be turned on at a preset duty cycle in each switch cycle, or control at least one upper bridge arm switching transistor and at least one lower bridge arm switching transistor of the bridge arms of the motor power circuit 120*a* to be alternately turned on, to increase the voltage between the two ends of the bus capacitor Cbus1.

The control apparatus 103 responds to a case in which the drive motor 11 rotates with the wheels 30 to generate an induced current and the voltage between the two ends of the bus capacitor Cbus1 of the dual-motor controller 120 is greater than the preset value, and the control apparatus 103 is configured to: control at least one upper bridge arm switching transistor of the bridge arms of the motor power circuit 120*a* to be turned on at a preset duty cycle in each switch cycle, or control at least one upper bridge arm switching transistor and at least one lower bridge arm switching transistor of the bridge arms of the motor power circuit 120*a* to be alternately turned on.

The control apparatus 103 provided in this embodiment of this application is configured to control the switch module S and the control circuit 102*b* based on running statuses of the powertrain 11 and the motor 12 to adjust the voltage between the two ends of the bus capacitor Cbus1, to adjust the voltage between the two ends of the bus capacitor Cbus2. In this way, the drive motor 11 runs in the highly efficient range or the induced current generated when the drive motor 11 rotates with the wheels 30 can charge the power battery 20, thereby improving energy utilization efficiency and the entire vehicle endurance of the electric vehicle.

Figure 10:
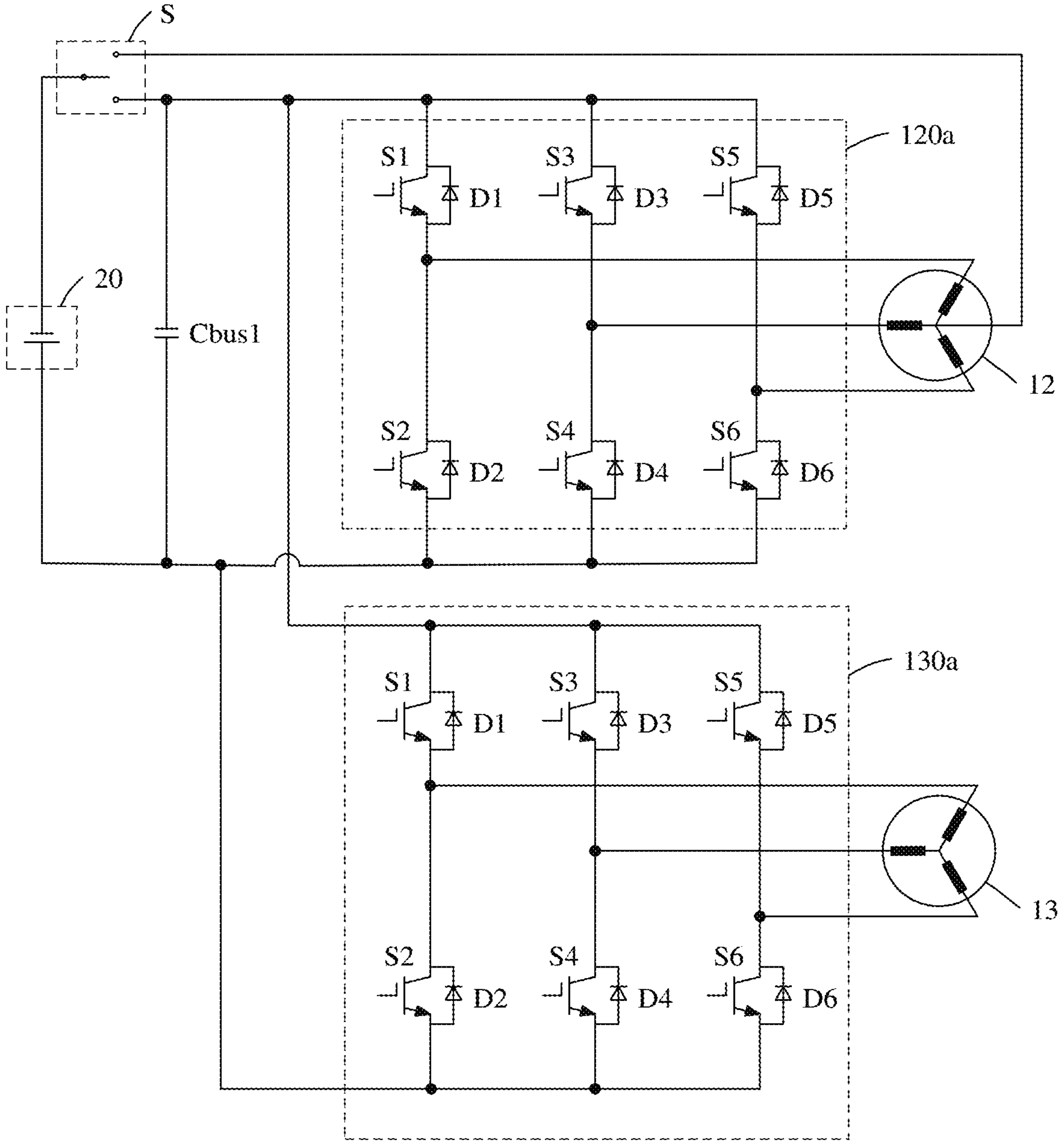
FIG. 10 is another diagram of a structure of a motor control apparatus according to this application.

Refer to FIG. 10. FIG. 10 is another diagram of a dual-motor controller 120 according to this application. A difference between the dual-motor controller 120 provided in this embodiment and the dual-motor controller 120 in FIG. 3 lies in that, in this embodiment, a first end of the switch module S is electrically connected to the negative electrode of the power battery 20.

A person of ordinary skill in the art should understand that the foregoing implementations are merely intended to describe this application, but are not intended to limit this application. Appropriate modifications and variations made to the foregoing embodiments shall fall within the protection scope of this application provided that the modifications and variations fall within the essence of this application.

What is claimed is:

1. A hybrid powertrain for an electric vehicle, wherein the hybrid powertrain comprises a generator; a motor; a dual-motor controller; and a switch module, wherein the dual-motor controller comprises a generator power circuit and a motor power circuit, wherein bridge arm midpoints of a plurality of switching transistor bridge arms of the generator power circuit are configured to connect to a multiphase winding of the generator, wherein bridge arm midpoints of a plurality of switching transistor bridge arms of the motor power circuit are configured to connect to a multiphase winding of the motor, wherein two ends of each switching transistor bridge arm of the generator power circuit are configured to connect to two ends of a bus capacitor, wherein each switching transistor bridge arm of the motor power circuit is configured to connect to the two ends of the bus capacitor, wherein a running status of the switch module comprises a first state and a second state, wherein the switch module is configured to connect to an end of a battery and a center tap of the multiphase winding of the motor based on the switch module being in the first state, wherein the switch module is configured to connect to the end of the battery and an end of each of the plurality of switching transistor bridge arms of the motor power circuit based on the switch module being in the second state, wherein in response to a first torque signal, the switch module is in the second state, the bridge arm midpoints of the plurality of switching transistor bridge arms of the motor power circuit output an alternating current to drive the motor to output torque indicated by the first torque signal, and the torque of the motor indicated by the first torque signal is greater than a preset torque value, and wherein in response to a second torque signal, the switch module is in the second state, switching transistors of the plurality of switching transistor bridge arms of the motor power circuit are turned off, and torque indicated by the second torque signal is less than the preset torque value.

2. The hybrid powertrain according to claim 1, wherein the motor is configured to be in transmission connection with a pair of wheels of the electric vehicle, and in a process that rotates the motor with the pair of wheels and the switch module runs in the first state, the multiphase winding of the motor and the plurality of switching transistor bridge arms of the motor power circuit form a voltage conversion circuit.

3. The hybrid powertrain according to claim 2, wherein in the process that rotates the motor with the pair of wheels, the voltage conversion circuit increases a voltage between the two ends of the bus capacitor in response to an output voltage of the battery being less than a preset voltage value and the switch module being in the first state.

4. The hybrid powertrain according to claim 1, wherein the dual-motor controller is configured to:

in response to an output voltage of the battery being less than a preset voltage value, control the generator to output an alternating current.

5. The hybrid powertrain according to claim 1, wherein in a process in which the motor rotates with a pair of wheels, in response to an output voltage of the battery being less than a preset voltage value and the switch module being in the first state, at least one lower bridge arm switching transistor of the switching transistor bridge arms of the motor power circuit is turned on at a preset duty cycle in each switch cycle, or at least one upper bridge arm switching transistor and at least one lower bridge arm switching transistor of the switching transistor bridge arms of the the motor power circuit are alternately turned on.

6. The hybrid powertrain according to claim 2, wherein the electric vehicle comprises a powertrain, wherein the powertrain comprises a motor controller and a drive motor, and in the process in which the motor rotates with the pair of wheels, in response to that a target torque value of the drive motor is greater than a preset torque value or a target rotation speed value of the drive motor is greater than a preset rotation speed value, at least one lower bridge arm switching transistor of the switching transistor bridge arms of the voltage conversion circuit is turned on at a preset duty cycle in each switch cycle, or at least one upper bridge arm switching transistor and at least one lower bridge arm switching transistor of the switching transistor bridge arms of the voltage conversion circuit are alternately turned on.

7. The hybrid powertrain according to claim 2, wherein in a process in which a drive motor rotates with a pair of wheels of the electric vehicle to generate an induced current, in response to that the voltage between the two ends of the bus capacitor is greater than a preset value, at least one upper bridge arm switching transistor and at least one lower bridge arm switching transistor of the voltage conversion circuit are alternately turned on.

8. The hybrid powertrain according to claim 2, wherein in a process in which a drive motor rotates with a pair of wheels of the electric vehicle to generate an induced current, in response to that the voltage between the two ends of the bus capacitor is greater than a preset value, at least one upper bridge arm switching transistor of the voltage conversion circuit is turned on at a preset duty cycle in each switch cycle.

9. The hybrid powertrain according to claim 1, wherein the switch module comprises a static contact and two moving contacts, the static contact of the switch module is connected to an end of the battery, and the two moving contacts of the switch module are respectively connected to a midpoint tap of the motor and an end of the plurality of switching transistor bridge arms of the motor power circuit.

10. The hybrid powertrain according to claim 1, wherein the switch module comprises a first switch and a second switch, the first switch is configured to connect to a midpoint tap of a drive motor and an end of the plurality of switching transistor bridge arms the motor power circuit, and the second switch is configured to connect to an end of the plurality of switching transistor bridge arms of the motor power circuit and an end of the battery.

11. A control apparatus for an electric vehicle comprising a hybrid powertrain, and a powertrain, wherein the hybrid powertrain comprises a generator, a motor, a dual-motor controller, and a switch module and is configured to be in transmission connection with a pair of wheels of the electric vehicle, and wherein the powertrain comprises a motor controller and a drive motor and is configured to be in transmission connection with the other pair of wheels of the electric vehicle, wherein the dual-motor controller comprises a generator power circuit and a motor power circuit, wherein bridge arm midpoints of a plurality of switching transistor bridge arms of the generator power circuit are configured to connect to a multiphase winding of the generator, wherein bridge arm midpoints of a plurality of switching transistor bridge arms of the motor power circuit are configured to connect to a multiphase winding of the motor, wherein two ends of each bridge arm of the plurality of switching transistor bridge arms of the generator power circuit are configured to connect to two ends of a bus capacitor, and wherein two ends of each bridge arm of the plurality of switching transistor bridge arms of the motor power circuit are configured to connect to the two ends of the bus capacitor; and the control apparatus is configured to control a running status of the switch module, wherein the running status of the switch module comprises a first state and a second state;

wherein the switch module is configured to connect to an end of a battery and a center tap of the multiphase winding of the motor based on the switch module being in the first state, wherein the switch module is configured to connect to the end of the battery and an end of each of the plurality of switching transistor bridge arms of the motor power circuit based on the switch module being in the second state, wherein in response to a first torque signal, the switch module is in the second state, the bridge arm midpoints of the plurality of switching transistor bridge arms of the motor power circuit output an alternating current to drive the motor to output torque indicated by the first torque signal, and the torque of the motor indicated by the first torque signal is greater than the preset torque value, wherein in response to a second torque signal, the switch module is in the second state, switching transistors of the plurality of switching transistor bridge arms of the motor power circuit are turned off, and torque indicated by the second torque signal is less than the preset torque value, and wherein in response to the motor rotating with the pair of wheels, control the switch module to run in the first state.

12. The control apparatus according to claim 11, wherein in a process in which the motor rotates with the pair of wheels and the drive motor drives the other pair of wheels, the control apparatus is further configured to:

in response to that a voltage between the two ends of the bus capacitor is less than a preset value, control at least one lower bridge arm switching transistor of the switching transistor bridge arms of the motor power circuit to be turned on at a preset duty cycle in each switch cycle, or control at least one upper bridge arm switching transistor and at least one lower bridge arm switching transistor of the switching transistor bridge arms of the motor power circuit to be alternately turned on.

13. The control apparatus according to claim 11, wherein the control apparatus is further configured to:

in response to that the drive motor rotates with the other pair of wheels to generate an induced current and a voltage between the two ends of the bus capacitor is greater than a preset value, control at least one upper bridge arm switching transistor of the switching transistor bridge arms of the motor power circuit to be turned on at a preset duty cycle in each switch cycle, or control at least one upper bridge arm switching transistor and at least one lower bridge arm switching transistor of the switching transistor bridge arms of the dual-motor controller to be alternately turned on.

14. A hybrid powertrain apparatus comprising:

a battery;

a motor including a multiphase winding;

a generator;

a motor power circuit including a plurality of switching transistor bridge arms configured to connect to the multiphase winding of the motor;

a generator power circuit including a plurality of switching transistor bridge arms configured to connect to the generator;

a switch module connected between the battery and the motor power circuit; and a control circuit configured to control the motor power circuit, the generator power circuit, and the switch module, wherein the control circuit is configured to:

operate the motor power circuit to output alternating current to the multiphase winding of the motor to drive the motor in response to a first torque signal; and in response to a second torque signal that is less than a preset torque value, control the switch module to be in a second state and turn off switching transistors of the plurality of switching transistor bridge arms of the motor power circuit.

15. The apparatus of claim 14, wherein the switch module comprises a static contact and a movable contact configured to connect an end of the battery to an end of the plurality of switching transistor bridge arms of the motor power circuit.

16. The apparatus of claim 14, wherein the control circuit is configured to place the switch module in a first state in response to the first torque signal.

17. The apparatus of claim 14, wherein the control circuit is configured to control the generator power circuit to output electrical power generated by the generator to charge the battery.

18. The apparatus of claim 14, wherein the plurality of switching transistor bridge arms comprise upper bridge arm switching transistors and lower bridge arm switching transistors.

* * * * *